(12) United States Patent
Kim et al.

(10) Patent No.: US 8,099,443 B2
(45) Date of Patent: Jan. 17, 2012

(54) APPARATUS FOR BUILDING ADDRESS DATABASE AND METHOD THEREOF

(75) Inventors: Ho Yon Kim, Daejeon (KR); Seung-Ick Jang, Daejeon (KR); Jong Heung Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 330 days.

(21) Appl. No.: 12/332,994

(22) Filed: Dec. 11, 2008

(65) Prior Publication Data

US 2009/0157733 A1   Jun. 18, 2009

(30) Foreign Application Priority Data

Dec. 13, 2007   (KR) .......................... 10-2007-0130132

(51) Int. Cl.
*G06F 7/00* (2006.01)
(52) U.S. Cl. ...................................................... 707/804
(58) Field of Classification Search .................. None
See application file for complete search history.

(56) References Cited

U.S. PATENT DOCUMENTS

2004/0225543 A1* 11/2004 Kapochunas et al. ............ 705/7
2006/0291692 A1* 12/2006 Nakao et al. ................. 382/101
2009/0055206 A1*  2/2009 Orbke ............................. 705/1

FOREIGN PATENT DOCUMENTS

| JP | 10-327185 | 12/1998 |
| JP | 2002-352189 | 12/2002 |
| JP | 2007-41919 | 2/2007 |
| KR | 10-2006-0135487 | 12/2006 |
| KR | 10-2007-0029910 | 3/2007 |

* cited by examiner

*Primary Examiner* — Tim T Vo
*Assistant Examiner* — Aaron Sanders
(74) *Attorney, Agent, or Firm* — Staas & Halsey LLP

(57) ABSTRACT

An apparatus for building an address database and a method includes: an address reading unit for reading an address from an address image; a read result storing unit for storing the read address and an accumulated value that represents the number of reads of the read address; an effective address storing unit for storing an effective address database that includes a plurality of effective addresses that substantially exist; and an effective address extracting unit for storing the read address to the effective address unit according to whether the accumulated value of the read address loaded from the read result storing unit is more than a predetermined threshold value. According to the present invention, the address database is built by verifying the address read from address information that is written on a piece of mail, thereby improving the reliability and completeness of the address database.

19 Claims, 8 Drawing Sheets

APPARATUS FOR BUILDING ADDRESS DATABASE AND METHOD THEREOF

CROSS-REFERENCE TO RELATED APPLICATION

This application claims priority to and the benefit of Korean Patent Application No. 10-2007-0130132 filed in the Korean Intellectual Property Office on Dec. 13, 2007, the entire contents of which are incorporated herein by reference.

BACKGROUND OF THE INVENTION (a) Field of the Invention

The present invention relates to an apparatus for building an address database and a method thereof.

More particularly, the present invention relates to an apparatus for extracting addresses from mail in which the addresses are respectively written and building an address database using the extracted addresses, and a method thereof.

The present invention was supported by the IT R&D program of MIC/IITA [2006-X-001-02, Development of Element Technology for Real-time Postal Distribution].

(b) Description of the Related Art

Address information can be used with many different objects, and has a large effect on performance of automatically classifying mail, Therefore, building an accurate address database is one of the necessary conditions for improving efficiency of a mail service.

As a result, there is need for collecting countrywide address information, building an address database using the addresses information, and then continuously managing and substantially utilizing the database.

Also, it is required to mobilize human resources and to continuously expend effort, and it is difficult to build an address database well. For these reasons, an attempt to build a mail address database has been recently realized in Korea.

In the related art, a mail address database is built by a method in which addresses are collected by postal service employees, and are arranged and input. However, there is a problem of reducing the reliability and quality of the address database because some mail addresses are omitted while collecting them and an operator may make a mistake while inputting them.

To solve the problem, it is possible to improve the quality of the address database by continuously checking and complementing it with an automatic classifier. However, this causes a huge expense by trial and error in the initial process of building the address database.

Also, even if the address database is initially perfect, the perfection of the address database is debased after a period since creation and extinction of mail addresses is repeated. Accordingly, to maintain the correspondence between data of the address database with real mail addresses in the country, there is no choice but to depend on endeavors of postal service employees such as collecting mail addresses, and of others. This continuously causes huge expenses to build and maintain the address database.

Further, it is possible to extract address information from mail by using an automatic recognition technology. However, there is a problem in the reliability of the extracted address information. Accordingly, it is difficult to apply the extracting of address information to building an address database that can be relied on.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus for building an address database with high reliability by verifying address information that is read from addresses of mail, and a method thereof.

An exemplary embodiment of the present invention provides an apparatus for building an address database with address images that include an address. The apparatus includes: an address reading unit for reading the address from the address image; a read result storing unit for storing the read address and an accumulated value that represents the number of reads of the read address; an effective address storing unit for storing an effective address database that includes a plurality of effective addresses that substantially exist; and an effective address extracting unit for storing the read address in the effective address storing unit according to whether the accumulated value of the read address loaded from the read result storing unit is more than a predetermined threshold value.

Another embodiment of the present invention provides a method for building an address database with address images that includes an address. The method includes: storing the address read from the address image and an accumulated value that represents the number of reads of the read address; determining whether the accumulated value of the read address is more than a predetermined threshold value; and storing the read address in an effective address database when the accumulated value of the read address is more than the predetermined threshold value, wherein the effective address database includes effective addresses that substantially exist.

Yet another embodiment of the present invention provides an apparatus for building an address database with address images that include an address. The apparatus includes: an address reading unit for reading the address from the address image; a read result storing unit for storing the read address and an accumulated value that represents the number of reads of the read address; an effective address storing unit for storing an effective address database that includes a plurality of effective addresses that substantially exist in the world; an effective address candidate extracting unit for setting the read address as an effective address candidate according to whether the accumulated value of the read address loaded from the read result storing unit is more than a predetermined threshold value; and an effective address verifying unit for outputting the effective address candidate and the address image corresponding to it, being provided with information by an address manager on whether the effective address candidate is the same as the address of the address image, and storing the effective address candidate in the effective address database based on the information.

Yet another embodiment of the present invention provides a method for building an address database with address images that includes an address. The method includes: storing the address read from the address image and an accumulated value that represents the number of reads of the read address; setting the read address as an effective address candidate when the accumulated valued of the read address is more than a predetermined threshold value; outputting the effective address candidate and the address image corresponding to it, and being provided with information on whether the effective address candidate is the same as the address of the address image input from an address manager; and storing the effective address candidate in an effective address database based on the information, wherein the effective address database includes effective addresses that substantially exist.

According to an embodiment of the present invention, by verifying address information read from addresses of mail and building an address database based on the address information, it is possible to improve reliability and completion of the address database.

Maintaining the data of the address database to correspond with real mail addresses is performed in addition to reading the address information. As a result, this allows a reduction in expenses and endeavors required to build the address database.

DETAILED DESCRIPTION OF THE EMBODIMENTS

Figure 1:
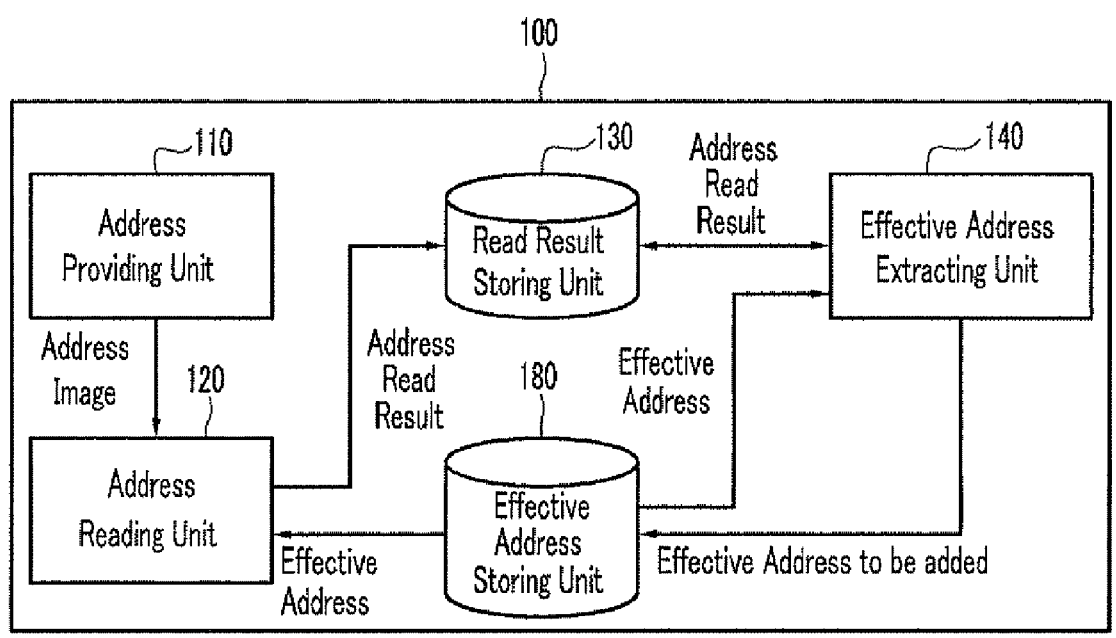
FIG. 1 shows a construction of an apparatus for building an effective address database according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Now, an apparatus for building an effective address database and a method thereof according to exemplary embodiments of the present invention will be explained in detail.

FIG. 1 shows a construction of an apparatus for building an effective address database according to a first exemplary embodiment of the present invention.

Referring to FIG. 1, the effective address database building apparatus 100 of the first exemplary embodiment of the present invention includes an address image providing unit 110, an address reading unit 120, a read result storing unit 130, an effective address extracting unit 140, and an effective address storing unit 180.

The address image providing unit 110 scans mail on which an address is written, generates an address image, and provides it to the address reading unit 120.

Here, the address image providing unit 110 may be a device for automatically providing mail like an automatic mail classifier or a device for providing images that are scanned by a camera or a scanner, and others.

The address reading unit 120 performs pre-processing for the address image that includes characters or barcodes, and recognizes it to generate an address character string corresponding to the address image. Also, the address reading unit 120 automatically reads an address from the address image provided from the address image providing unit 110 by using techniques like barcode reading, character recognition, and address interpretation.

Here, since it is not able to obtain new added address information with a recognizing device that can read addresses from an address database by performing post-processing for the address of the address database, the address reading unit 120 reads the address from the address image without using the address database.

Also, the address reading unit 120 reads not only addresses that include a character string, but also address information that is constituted of barcodes. Accordingly, it may be able to reduce errors in reading the addresses.

The read result storing unit 130 stores and manages a plurality of addresses that are read by the address reading unit 120.

In this case, when an address that is identical to an address that has been stored in the read result storing unit 130 is input, the read result storing unit 130 generates an accumulated value for the address and stores it to be matched with the address. Here, the accumulated value is used for extracting an effective address.

The read result storing unit 130 stores the address character string and stores detailed information like a house number and a block number or a room number of a building as it is.

In this case, the read result storing unit 130 may use address information like a name of an administrative district after performing address interpretation and post-processing on the address information.

When performing the address interpretation, extraction and analysis of the detailed address information like the block number and the room number is performed since it is relative easy to build an administrative district name database according to an address organization.

The effective address extracting unit 140 loads and analyzes read addresses and accumulated values of those that are results obtained by reading a plurality of address images and are stored in the read result storing unit 130. Then, the effective address extracting unit 140 extracts an address with a high possibility from the read addresses, the possibility representing that the address may be real and effective.

Here, the effective address extracting unit 140 checks the accumulated values, determines a read address of an accumulated value that is more than a predetermined threshold value as an effective address, and stores the effective address in the effective address storing unit 180.

The effective address storing unit 180 stores and manages an effective address database that includes real and effective addresses.

The effective address storing unit 180 provides information that is needed to determine whether an address read by the address reading unit 120 really exists in the world, and also provides information that is needed for the effective address extracting unit 140 to extract an effective address from a plurality of read addresses stored in the read result storing unit 130.

In addition, the effective address storing unit 180 stores the effective address that is determined as a real existing address by the effective address extracting unit 140.

Now, referring to FIG. 2, a method for building the effective address database according to the first exemplary embodiment of the present invention will be described.

Figure 2:
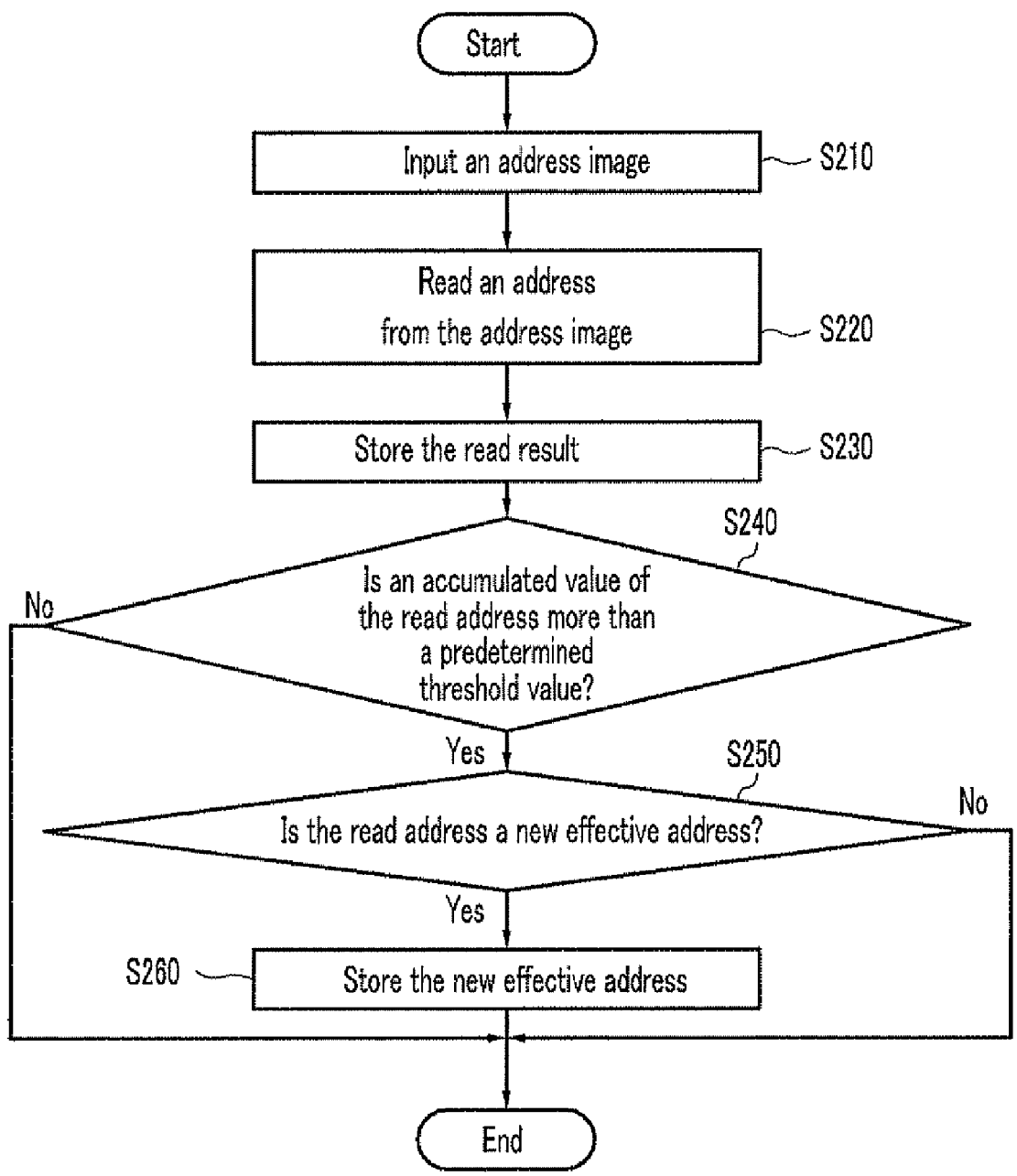
FIG. 2 shows a flowchart of a method for building the effective address database according to the first exemplary embodiment of the present invention.

FIG. 2 shows a flowchart of the method for building the effective address database according to the first exemplary embodiment of the present invention.

The method according to the first exemplary embodiment of the present invention relates to processes for determining whether or not an address of an address image is an effective address in real time when the address image is input, and building the effective address database based on the effective address.

First, the address image providing unit 110 generates an address image by scanning an address of a piece of mail, that is, a part at which the address is written on the mail, and provides the address image to the address reading unit 120 (S210). The address reading unit 120 reads the address from the address image (S220) and stores the read address and an accumulated value of the read address in the read result storing unit 130 (S230).

Next, the effective address extracting unit 140 loads read address results that include the read addresses and the accumulated values thereof and determines whether or not each of the accumulated values is more than the predetermined threshold value (S240).

In step S240, when the accumulated value is more than the predetermined threshold value, the effective address extracting unit 140 determines whether a read address having the accumulated value is a new effective address by checking whether or not it is in the effective address database of the effective address storing unit 180 (S250).

In step S250, when the read address having the accumulated value is determined to be a new effective address since the read address is not in the effective address database, the effective address extracting unit 140 sets the read address as the new effective address and stores it in the effective address database of the effective address storing unit 180 (S260).

However, when the read address does not have an accumulated value that is more than the predetermined threshold value in step S240 or when the read address having the accumulated value is not determined as the new effective address in step S250, the above processes for the method terminate.

Figure 3:
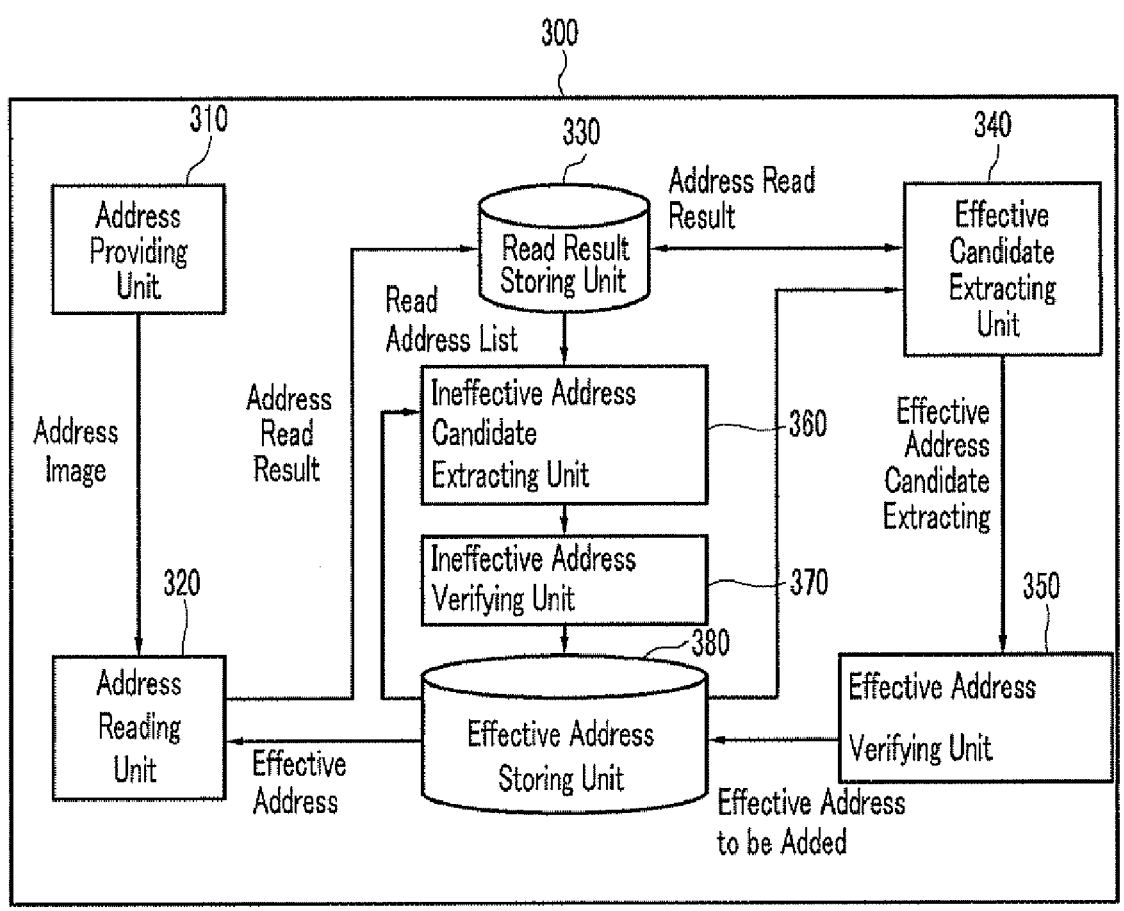
FIG. 3 shows a construction of an apparatus for building an effective address database according to a second exemplary embodiment of the present invention.

FIG. 3 shows an apparatus for building an effective address database according to a second exemplary embodiment of the present invention.

Referring to FIG. 3, the effective address database building apparatus 300 according to the second exemplary embodiment of the present invention includes an address image providing unit 310, an address reading unit 320, a read result storing unit 330, an effective address candidate extracting unit 340, an effective address verifying unit 350, an ineffective address candidate extracting unit 360, an ineffective address verifying unit 370, and an effective address storing unit 380.

Here, the construction of the effective address database building apparatus according to the second exemplary embodiment of the present invention is similar to that of the apparatus according to the first exemplary embodiment of the present invention. Therefore, descriptions of constituent elements that are the same as those of the first exemplary embodiment will be omitted.

The effective address candidate extracting unit 340 loads and analyzes read results that have been accumulated and stored in the read result storing unit 330, and then extracts an address with a high possibility, the possibility representing that the address may be real and effective.

Here, the effective address candidate extracting unit 340 selects effective addresses using accumulated statistics, as does the effective address extracting unit 140 of the first exemplary embodiment.

For example, after address read results have been accumulated for a regular period or after the amount of the address read results satisfies a predetermined amount, an address that appears over a threshold number of times in the read results is determined as an effective address that really exists. When the address determined as the effective address is not included in an effective address database of the effective address storing unit 380, the address is set as an effective address candidate.

The effective address verifying unit 350 verifies the addresses extracted by the effective address candidate extracting unit 340, that is, effective address candidates. Here, the effective address verifying unit 350 outputs the effective address candidate and the address image that is obtained through scanning the mail by the address image providing unit 310 and is based on selecting the effective address candidate. Also, the effective address verifying unit 350 is provided with input of an address manager that determines efficiency of the effective address candidates and stores an effective address candidate that is determined efficient by the address manager in the effective address database of the effective address storing unit 380 since the effective address candidate is the same as the address of the address image.

In this case, the effective address verifying unit 350 outputs the address image that is based on selecting the effective address candidates as a video scenes so that the address manager sees the video scene and determines whether reading of the address image is correctly performed.

Here, verifying the effective address may be classified into a process for determining whether an address that is read and provided by the address reading unit 320 is identical to an address of an address image, and a process for determining whether the provided address is really used in a piece of mail.

In this case, the latter process may be performed based on knowledge of the area in question. Therefore, a person such as a postal service employee or a municipal official of the area is needed.

Since it is difficult for the same person to perform both processes, as occasion demands, the effective address verifying unit 350 may perform the verifying of the effective address by determining efficiency of the read result based on the address image and verifying efficiency of an effective address to be added.

Adding the effective address may be realized by an online real-time effective address database adding method for determining whether the address of the read result is an effective address whenever the read result is input and an offline effective address database adding method for extracting effective addresses by analyzing the accumulated read results at the same time.

The ineffective address candidate extracting unit 360 loads and analyzes the read results that have been accumulated in the read result storing unit 330 and extracts addresses of a high possibility that the addresses may not really exist from addresses of the effective address storing unit 380.

Here, the ineffective address candidate extracting unit 360 selects ineffective addresses using accumulated statistics.

For example, after address read results have been accumulated for a regular period or after the amount of the address read results satisfies the predetermined amount, an address that appears less than a threshold number of times in the read results is determined as an ineffective address. When the address determined as the ineffective address is stored in the effective address database of the effective address storing unit 380, the address is set as an ineffective address candidate.

The ineffective address verifying unit 370 outputs the ineffective address candidate and the address image that is obtained through scanning the mail by the address image providing unit 310 and is based on selecting the ineffective address candidate. Also, the ineffective address verifying unit 370 is provided with an input of the address manager that determines inefficiency of the ineffective address candidates and deletes the ineffective address candidate from the effective address database when the address manager determines that the ineffective address candidate has no efficiency because the ineffective address candidate is the same as the address of the address image.

In this case, the ineffective address verifying unit 370 outputs the address image that is based on selecting the ineffective address candidates as a video scene so that the address manager sees the video scene and determines whether reading the address image is correctly performed.

Next, a method for building an online real-time effective address and a method for building an offline effective address database will described with reference to FIGS.

The online real-time effective address database building method determines an address of an address image is an effective address in real-time when the address image is input through the address image providing unit 310 and adds the address of the address image to the effective address database when the address image is determined as the effective address.

The offline effective address database building method determines that addresses of address images are effective addresses after the address images over a predetermined number are accumulated in the read result storing unit 310 and then adds the addresses of the address images that are determined as the effective addresses into the effective address database.

Now, the online real-time effective address database building method will be described.

Figure 4:
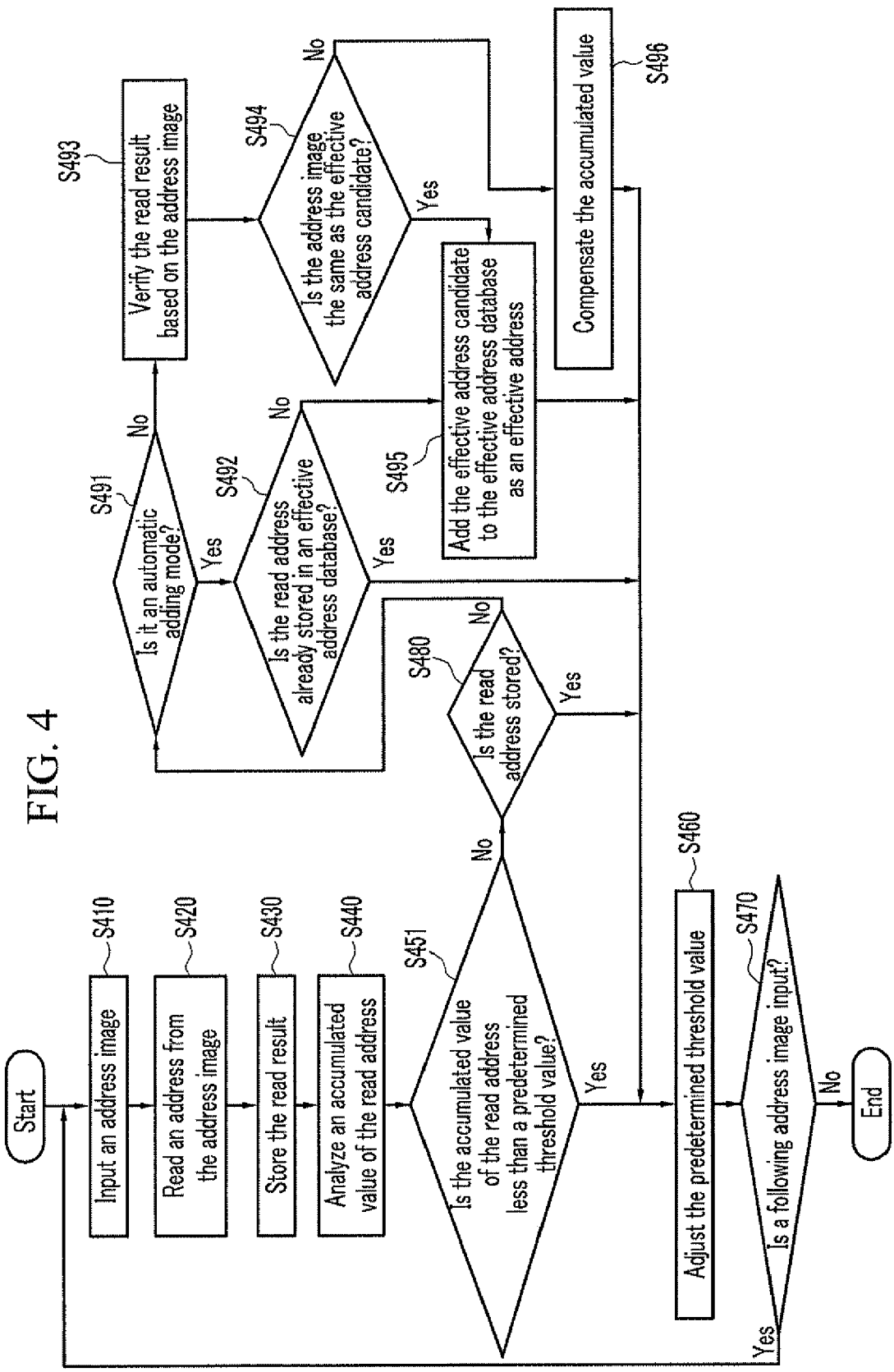
FIG. 4 shows a flowchart of a method for building the effective address database in real time online according to the second exemplary embodiment of the present invention.
Figure 5:
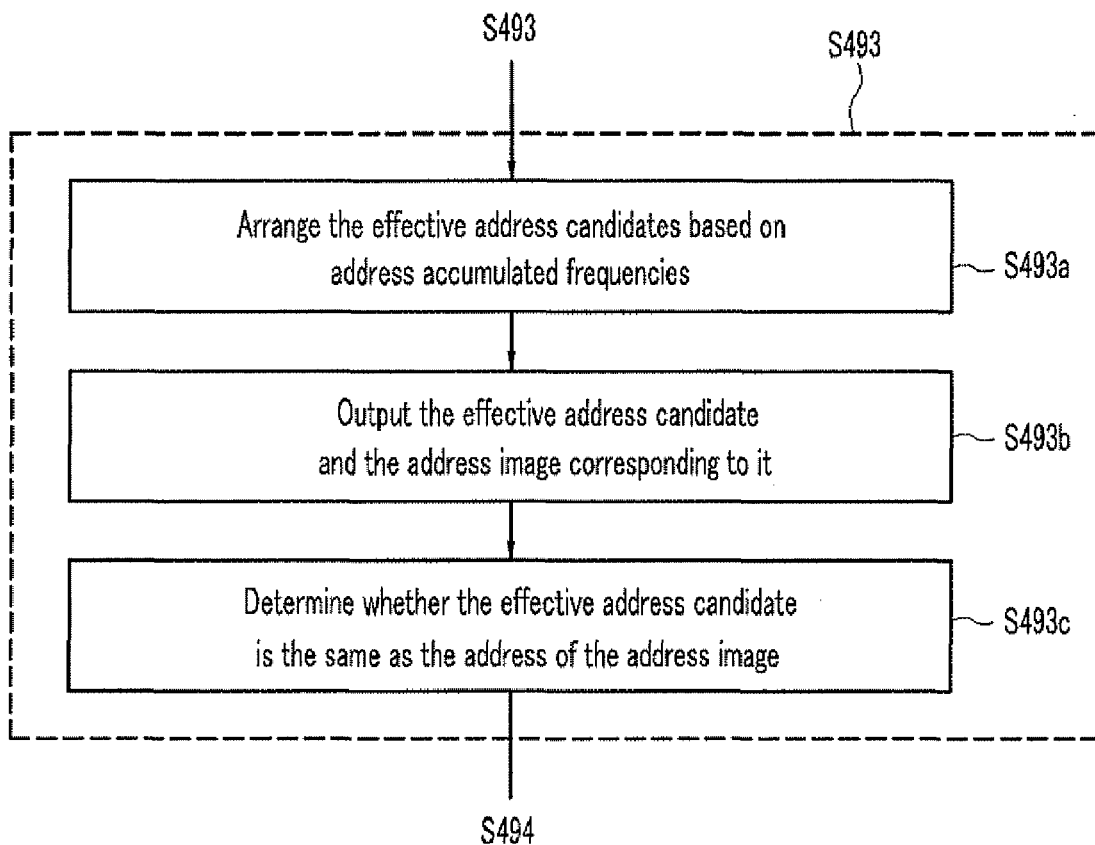
FIG. 5 shows a flowchart of a detailed process of the step S493 in the method for building the effective address database in real time online according to the second exemplary embodiment of the present invention.

FIG. 4 shows a flowchart of the online real-time effective address database building method according to the second exemplary embodiment of the present invention. FIG. 5 shows a flowchart of a step of the online real-time effective address database building method.

The online real-time effective address database building method will be described with reference to FIGS. 4 and 5.

The address image providing unit 310 generates an address image by scanning a part of a piece of mail at which an address is written and inputs the address image to the address reading unit 320 (S410). The address reading unit 320 reads the address from the address image (S420) and stores the read address to the read result storing unit 330 (S 430).

In this case, there are a plurality of read addresses and accumulated values corresponding to each of the read addresses in the read result storing unit 330, wherein the accumulated value represents the accumulated number of times that a corresponding read address is read and stored.

The effective address candidate extracting unit 340 analyzes the read address and the accumulated value thereof from the read result storing unit 330 (S440), and determines whether the accumulated value of the read address is less than a predetermined threshold value (S450).

When the accumulated value of the read address is less than the predetermined threshold value (S451), the effective address candidate extracting unit 340 adjusts the predetermined threshold value (S460).

Here, the predetermined threshold value is adjusted according to the following Equations 1 and 2.

$$T = \max((ksE/P), L) \quad \text{(Equation 1)}$$

(k>0, L>0, k and L are constants)

$$T = \max((ksN/D), L) \quad \text{(Equation 2)}$$

(k>0, L>0, k and L are constants)

Here, T represents a threshold value that is a reference for determining an effective address, N represents the total number of provided address images, E represents the number of mail pieces that have an effective address (E<=N), D represents the number of postal delivery branch offices that are in an area, and P represents the number of postal delivery branch offices in which effective address mail pieces appear.

Also, N, E, D, P>m. L represents the minimum threshold value, and m represents the minimum number of postal delivery branch offices used in delivering the mail pieces.

When n(a) represents appearance accumulation frequency of a read address, if n(a)>=T, the read address is an effective address, and if n(a)<T, the read address is an ineffective address.

Then, the effective address candidate extracting unit 340 determines whether a new read address from the address image providing unit 310 is input and stored in the read result storing unit 330 (S470), and terminates the above-described processes when the new read address is not input and stored.

Meanwhile, in step S450, when the accumulated value of the read address is not less than the predetermined threshold value, the effective address candidate extracting unit 340 determines the read address as an effective address. Then, the effective address candidate extracting unit 340 determines whether the read address is in the effective address database of the effective address storing unit 380 (S480).

When the read address is not in the effective address database of the effective address storing unit 380, the effective address candidate extracting unit 340 determines whether a current mode is an automatic adding mode for automatically storing an effective address in the effective address database of the effective address storing unit 380 when the effective address is determined (S491).

When the current mode is not the automatic adding mode, as shown in FIG. 5, the effective address verifying unit 350 outputs the effective address candidate determined by the effective address candidate extracting unit 360 and the address image that corresponds to the effective address candidate and is provided from the address image providing unit 310 (S493b). Then, the effective address verifying unit 350 is provided with information on whether the effective address candidate is identical with the address of the address image by the address manager (S493c).

In this case, a step of S493a for arranging effective address candidates in order of the appearance accumulation frequency to improve handling efficiency of the address manager may be inserted between step S493 and step S493b.

The effective address verifying unit 350, as shown in FIG. 4, determines whether the effective address candidate is the same as the address of the address image based on the information input from the address manager, (S494).

When the effective address candidate is the same as the address of the address image, the effective address verifying unit 350 adds the effective address candidate in the effective address database of the effective address storing unit 380 (S495) and goes to step S460.

However, when the effective address candidate is not that same as the address of the address image, compensation for the accumulated value of the effective address candidate stored in the read result storing unit 330 is performed (S496), and then step S460 is performed.

Here, for example, the effective address candidate extracting unit 340 subtracts "1" from the accumulated value of the effective address candidate because the effective address candidate is not identical with the address of the address image.

Meanwhile, in step S491, when the current mode is the automatic adding mode, the effective address verifying unit 350 determines whether the effective address candidate determined by the effective address candidate extracting unit 340 is in the effective address database of the effective address storing unit 380 (S492).

When the effective address candidate determined by the effective address candidate extracting unit 340 is in the effective address database of the effective address storing unit 380, the effective address verifying unit 350 goes to step S460. However, when it is not in the effective address database, the effective address verifying unit 350 goes to step S495.

Next, the offline effective address database building method will be described.

Figure 6:
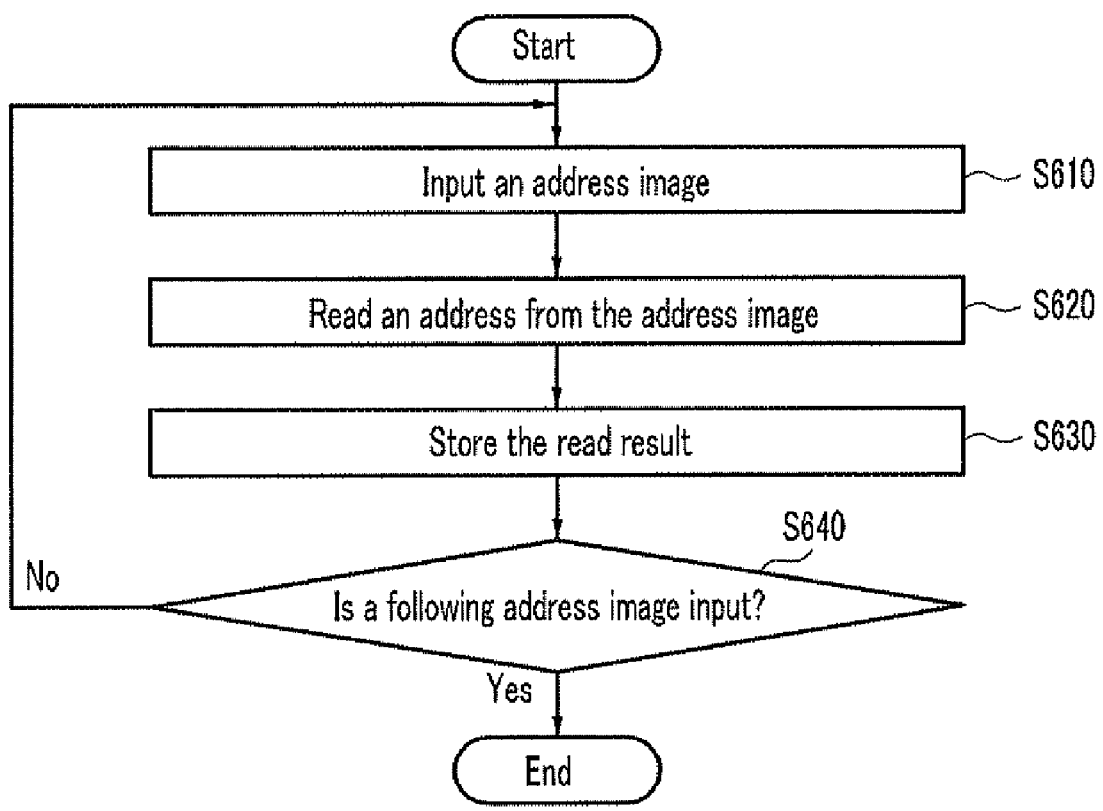
FIG. 6 shows a flowchart of a process for storing a read result in the method for building the effective address database in offline according to the second exemplary embodiment of the present invention.
Figure 7:
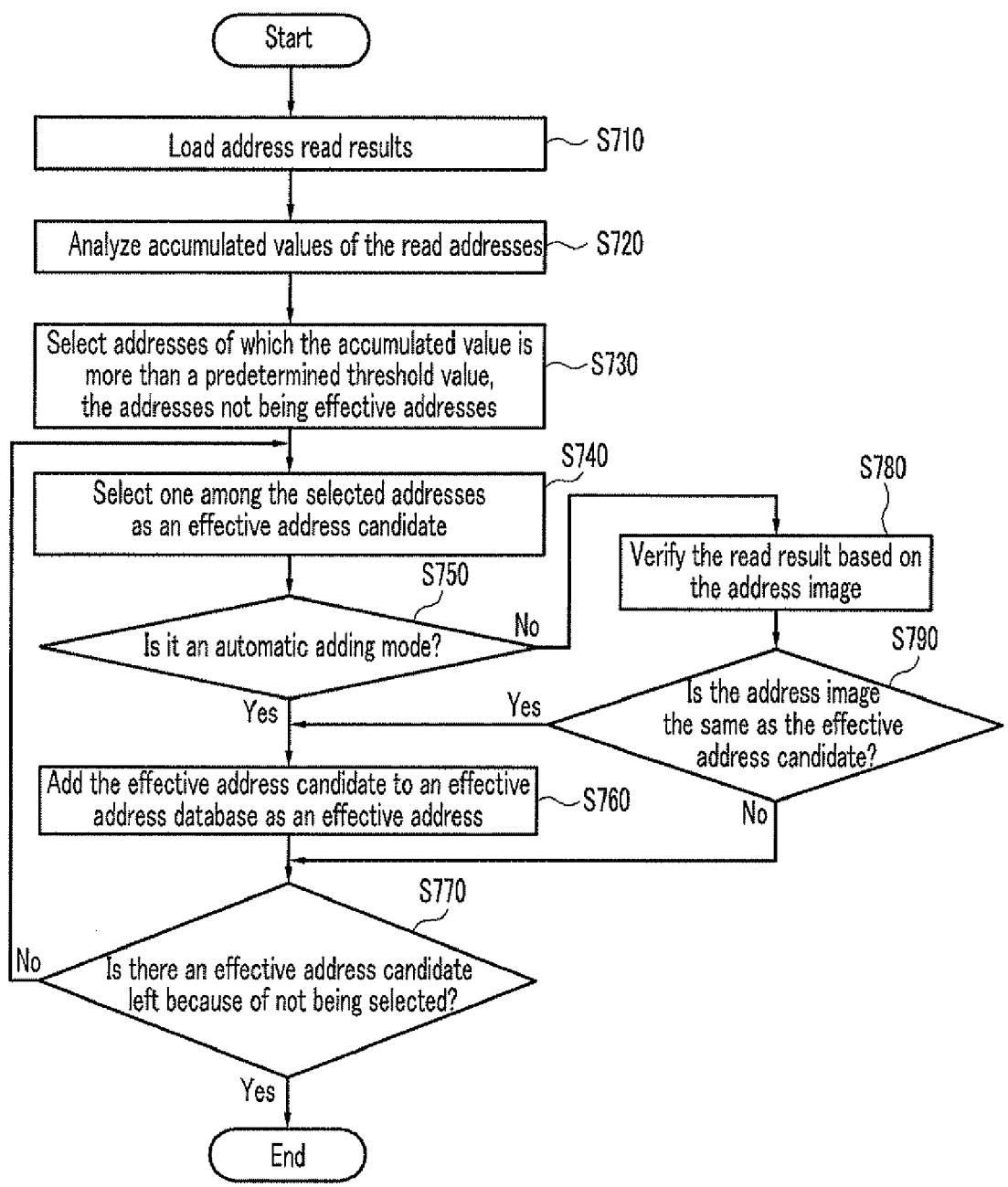
FIG. 7 shows a flowchart of a process for adding an effective address candidate to the address database in the method for building the effective address database offline according to the second exemplary embodiment of the present invention.
Figure 8:
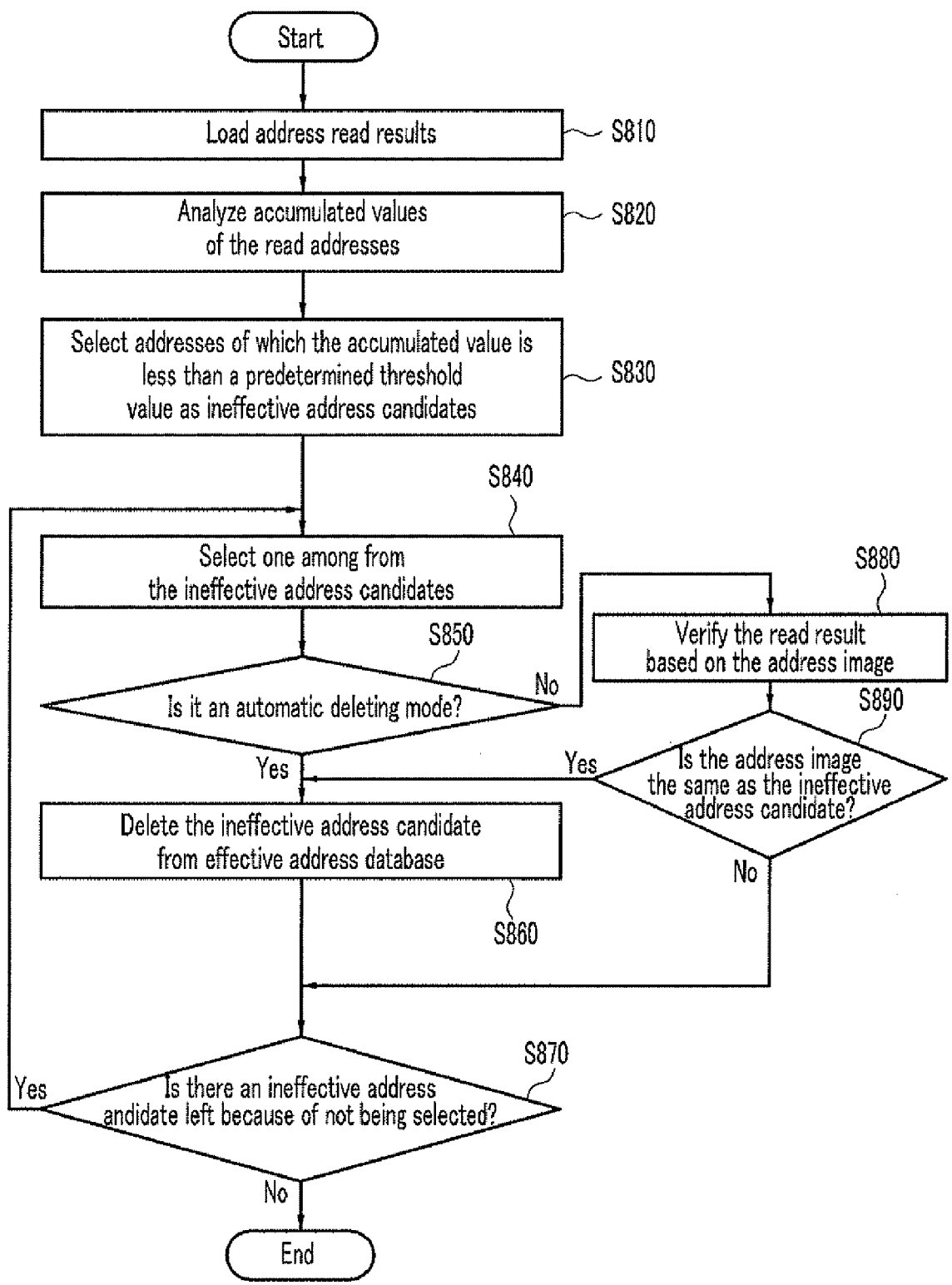
FIG. 8 shows a flowchart of a process for deleting an ineffective address candidate from the address database in the method for building the effective address database offline according to the second exemplary embodiment of the present invention.

FIG. 6 shows a flowchart of a process for storing a read result in the offline effective address database building method according to the second exemplary embodiment of the present invention. FIGS. 7 and 8 show a flowchart of a process for adding an effective address candidate to the effective address database and a flowchart of a process for deleting an ineffective address candidate from the effective address database, respectively, in the offline effective address database building method according to the second exemplary embodiment of the present invention.

First, the process for storing the read result in the offline effective address database building method will described with reference to FIG. 6.

The address image providing unit 310 generates an address image by scanning a part of a piece of mail in which an address is written and inputs the address image to the address reading unit 320 (S610). The address reading unit 320 reads the address from the address image (S620) and stores the read address to the read result storing unit 330 (S630).

In this case, there are a plurality of read addresses and accumulated values corresponding to each of the read addresses in the read result storing unit 330, wherein the accumulated value represents the accumulated number of times when a corresponding read address is read and stored.

Then, the address image providing unit 310 determines whether a new address image is generated by scanning a new piece of mail (S640) and terminates the process when the new address image is not generated.

Here, the address image providing unit 310 repeats the steps of S610-S640 when the new address image is generated.

Next, referring to FIG. 7, the process for adding the effective address candidate to the effective address database in the offline effective address database building method according to the second exemplary embodiment of the present invention will be described.

When a predetermined time has elapsed, for example when a predetermined time has elapsed after the start of the process for storing the read result in the read result storing unit 330, or when the number of read results read from address images is over a predetermined number, the effective address candidate estractinq unit 340 loads the read results from the read result storing unit 330 (S710) and analyzes the accumulated values corresponding to the read address of the read results (S720).

The effective address candidate extracting unit 340 selects addresses that have an accumulated value being over a predetermined threshold value and are not in the effective address database of the effective address storing unit 380 from among the read results (S730).

Here, the selected address is set as an effective address candidate.

The effective address verifying unit 350 selects one from among the effective address candidates selected by the effective address candidate extracting unit 340 and determines whether a current mode is an automatic adding mode for automatically storing an effective address candidate in the effective address database of the effective address storing unit 380 (S750).

When, the current mode is the automatic adding mode in step S750, the effective address verifying unit 350 stores the selected effective address candidate in the effective address database of the effective address storing unit 380 (S760) and determines whether there is any effective address candidate left among the effective address candidates selected by the effective address candidate extracting unit 340 because it is not selected (S770).

When there is an effective address candidate left, the effective address verifying unit 350 goes step S740.

Meanwhile, when the current mode is not the automatic adding mode in step S750, the effective address verifying unit 350 outputs the selected effective address candidate and the address image corresponding to it for the address manager to see. Then, the effective address verifying unit 350 is provided with an input according to verification by the address manager (S780).

The effective address verifying unit 350 determines whether the output effective address candidate is the same as the address of the address image based on the input of the address manger (S790).

The effective address verifying unit 350 goes to step S760 when the output effective address candidate is identical with the address of the address image and goes to step S770 when the output effective address candidate is not the same as the address of the address image.

Next, referring to FIG. 8, the process for deleting the effective address candidate from the effective address database in the offline effective address database building method according to the second exemplary embodiment of the present invention will be described.

When a predetermined time has elapsed, for example when the predetermined time has elapsed after the start of the process for storing the read result in the read result storing unit 330, or when the number of the read results read from address images is over a predetermined number, the ineffective address candidate extracting unit 360 loads the read results from the read result storing unit 330 (S810) and analyzes the accumulated values corresponding to the read address of the read results (S820).

The ineffective address candidate extracting unit 360 selects addresses that have an accumulated value being less than a predetermined threshold value and are in the effective address database of the effective address storing unit 380 from among the read results (S830).

Here, the selected address is set as an ineffective address candidate.

The ineffective address verifying unit 370 selects one from among the ineffective address candidates selected by the ineffective address candidate extracting unit 360 and determines whether a current mode is an automatic deleting mode for automatically deleting an ineffective address candidate from the effective address database of the effective address storing unit 380 (S850).

When the current mode is the automatic deleting mode in step S850, the ineffective address verifying unit 370 deletes the selected ineffective address candidate from the effective address database of the effective address storing unit 380 (S860) and determines whether there is an ineffective address candidate left among the ineffective address candidates selected by the ineffective address candidate extracting unit 360 because it is not selected (S870).

When there is an ineffective address candidate left, the ineffective address verifying unit 370 goes to step S840.

Meanwhile, when the current mode is not the automatic deleting mode in step 5850, the ineffective address verifying unit 370 outputs the selected ineffective address candidate and the address image corresponding to it for the address manager to see. Then, the ineffective address verifying unit 370 is provided with an input according to verification of the address manager (S880).

The ineffective address verifying unit 370 determines whether the output ineffective address candidate is the same as the address of the address image based on the input of the address manger (S890).

The ineffective address verifying unit 370 goes to step S860 when the output ineffective address candidate is the same as the address of the address image, and goes to step S870 when the output ineffective address candidate is not identical with the address of the address image.

The above-mentioned exemplary embodiments of the present invention are not embodied only by a method and apparatus. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for building an address database with address images that includes an address, the apparatus comprising:
    an address reading unit for reading the address from the address image;
    a read result storing unit for storing the read address and an accumulated value, wherein the accumulated value represents the number of times that the read address is read;
    an effective address storing unit for storing an effective address database that includes a plurality of effective addresses that exist; and
    an effective address extracting unit for storing the read address in the effective address unit according to whether the accumulated value of the read address loaded from the read result storing unit is more than a predetermined threshold value.

2. The apparatus of claim 1, wherein the effective address extracting unit determines the read address as an effective address when the accumulated value of the read address is more than the predetermined threshold value and stores the read address in the effective address storing unit.

3. The apparatus of claim 1, wherein the effective address extracting unit stores the read address in the effective address storing unit when the accumulated value of the read address is more than the predetermined threshold value and there is no address that is the same as the read address in the effective address database of the effective address storing unit.

4. A method for building an address database with address images that includes an address, the method comprising:
    storing the address read from the address image and an accumulated value, wherein the accumulated value represents the number of times that the read address is read;
    determining whether the accumulated value of the read address is more than a predetermined threshold value; and
    storing the read address in an effective address database when the accumulated value of the read address is more than the predetermined threshold value,
    wherein the effective address database includes effective addresses that exist.

5. The method of claim 4, wherein the determining stores the read address in the effective address database when the accumulated value of the read address is more than the predetermined threshold value and there is no address that is the same as the read address in the effective address database.

6. An apparatus for building an address database with address images that includes an address, the apparatus comprising:
    an address reading unit for reading the address from the address image;
    a read result storing unit for storing the read address and an accumulated value, wherein the accumulated value represents the number of times that the read address is read;
    an effective address storing unit for storing an effective address database that includes a plurality of effective address that exist in the world;
    an effective address candidate extracting unit for setting the read address as an effective address candidate according to whether the accumulated value of the read address loaded from the read result storing unit is more than a predetermined threshold value; and
    an effective address verifying unit for outputting the effective address candidate and the address image corresponding to it, being provided with information on whether the effective address candidate is the same as the address of the address image, the information being input by an address manager, and storing the effective address candidate in the effective address database based on the information.

7. The apparatus of claim 6, wherein the effective address candidate extracting unit set the read address as the effective address candidate when the accumulated value of the read address is more than the predetermined threshold value and there is no address that is the same as the read address in the effective address database of the effective address storing unit.

8. The apparatus of claim 7, wherein the effective address verifying unit stores the effective address candidate in the effective address database of the effective address storing unit when the information input from the address manager indicates that the effective address candidate is the same as the address of the address image.

9. The apparatus of claim 8, wherein the effective address verifying unit compensates the accumulated value of the effective address candidate, the accumulated value being stored in the read result storing unit, when the information input from the address manager indicates that the effective address candidate is not the same as the address of the address image.

10. The apparatus of claim 6, wherein the effective address extracting unit adjusts the predetermined threshold value based on the number of address images, the number of mail pieces that have an effective address, the number of postal delivery branch offices that are in an area corresponding to the provided address image, and the number of postal delivery branch offices in which mail of an effective address appears.

11. The apparatus of claim 10, wherein the effective address extracting unit adjusts the predetermined threshold value based on one of the following equations, wherein the number of the address images is N, the number of mail pieces that have an effective address is E, the number of postal delivery branch offices that are in an area corresponding to the provided address image is D, and the number of postal delivery branch offices in which a mail piece of an effective address appear is P:

$$T=\max((ksE/P),L)$$

(k>0, L>0, k and L are constants)

$$T=\max((ksN/D),L)$$

(k>0, L>0, k and L are constants).

12. The apparatus of claim 10, wherein the effective address extracting unit further includes
an ineffective address candidate extracting unit for setting the read address as an ineffective address candidate when the accumulated value of the read address is less than the predetermined threshold value, the ineffective address candidate having a possibility that addresses doe not exist; and
an ineffective address verifying unit for outputting the ineffective address candidate and the address image corresponding to it, and deleting the ineffective address candidate from the effective address database when information on whether the ineffective address candidate is not the same as the address of the address image that is input from the address manager.

13. A method for building an address database with address images that includes an address, the method comprising:
storing the address read from the address image and an accumulated value, wherein the accumulated value represents the number of times that the read address is read;
setting the read address as an effective address candidate when the accumulated valued of the read address is more than a predetermined threshold value;
outputting the effective address candidate and the address image corresponding to it, and being provided with information on whether the effective address candidate is the same as the address of the address image that is input from an address manager; and
storing the effective address candidate in an effective address database based on the information, wherein the effective address database includes effective addresses that exist.

14. The method of claim 13, wherein the setting of the read address sets the read address as the effective address candidate when the accumulated value of the read address is more than the predetermined threshold value and there is no address that is the same as the read address in the effective address database.

15. The method of claim 14, wherein the storing of the effective address candidate stores the effective address candidate in the effective address database when the information indicating the effective address candidate is the same as the address of the address image is input from the address manager.

16. The method of claim 15, wherein the storing of the effective address candidate compensates the accumulated value corresponding to the effective address candidate when the information indicating the effective address candidate is not the same as the address of the address image is input from the address manager.

17. The method of claim 13, wherein the setting of the read address sets the read address as an ineffective address candidate when the accumulated value of the read address is not more than the predetermined threshold value and there is an address that is the same as the read address in the effective address database.

18. The method of claim 17, further comprising
adjusting the predetermined threshold value based on the number of address images, the number of mail pieces that have an effective address, the number of postal delivery branch offices that are in an area corresponding to the provided address image, and the number of postal delivery branch offices in which mail pieces of an effective address appear.

19. The method of claim 18, wherein the adjusting of the predetermined threshold value adjusts the predetermined threshold value based on one of the following equations, wherein the number of address images is N, the number of mail pieces that have an effective address is E, the number of postal delivery branch offices that are in an area corresponding to the provided address image is D, and the number of postal delivery branch offices in which the mail of the effective address appears is P:

$$T=\max((ksE/P),L)$$

(k>0, L>0, k and L are constants)

$$T=\max((ksN/D),L)$$

(k>0, L>0, k and L are constants).

* * * * *